United States Patent [19]

Dale

[11] Patent Number: 5,076,243
[45] Date of Patent: Dec. 31, 1991

[54] FUEL SUPPLY SYSTEM FOR AN INTERNAL COMBUSTION ENGINE

[75] Inventor: Thomas D. Dale, Edenton, N.C.

[73] Assignee: Kingsdale International, Inc., Edenton, N.C.

[21] Appl. No.: 614,145

[22] Filed: Nov. 15, 1990

[51] Int. Cl.⁵ .................... F02M 17/00; F02M 31/00
[52] U.S. Cl. ................................ 123/522; 123/557; 261/DIG. 83; 261/75
[58] Field of Search .............. 123/522, 536, 538, 557, 123/543; 261/DIG. 83, 75

[56] References Cited

U.S. PATENT DOCUMENTS

| | | | |
|---|---|---|---|
| 837,984 | 12/1906 | Vail . | |
| 1,159,933 | 11/1915 | Grove | 261/145 |
| 1,605,251 | 11/1926 | Millan et al. | 261/DIG. 83 |
| 1,798,065 | 3/1931 | Clark . | |
| 1,938,497 | 12/1933 | Pogue . | |
| 1,997,497 | 4/1935 | Pogue | 261/151 |
| 2,026,798 | 1/1936 | Pogue | 261/131 |
| 2,109,878 | 3/1938 | Burrell | 261/151 |
| 2,133,757 | 10/1938 | Smith | 261/18 |
| 3,049,850 | 8/1962 | Smith | 55/228 |
| 3,294,381 | 12/1966 | Schwartz | 261/145 |
| 3,635,200 | 1/1972 | Rundell et al. | 123/536 |
| 3,931,801 | 1/1976 | Rose et al. | 123/134 |
| 4,108,953 | 8/1978 | Rocco | 261/142 |
| 4,270,506 | 6/1981 | Lowe | 123/523 |
| 4,312,317 | 1/1982 | Jewett et al. | 123/522 |
| 4,331,128 | 1/1982 | Bernecker | 123/557 |
| 4,368,163 | 1/1983 | Covey | 261/DIG. 83 |
| 4,368,711 | 1/1983 | Allen | 123/522 |
| 4,409,946 | 10/1983 | Sandford et al. | 123/557 |
| 4,517,926 | 5/1985 | Reinhard et al. | 123/557 |
| 4,551,153 | 11/1985 | Won | 48/102 |
| 4,665,879 | 5/1987 | Earl | 123/557 |
| 4,883,040 | 11/1989 | Rocky | 123/557 |

*Primary Examiner*—Andrew M. Dolinar
*Assistant Examiner*—M. Macy
*Attorney, Agent, or Firm*—Bell, Seltzer, Park & Gibson

[57] ABSTRACT

Liquid gasoline introduced from a suitable source into a treatment tank of the system is transformed into a relatively dry vaporous state substantially free from large droplets or similar particles. Pellets within an outer chamber of the vessel are propelled by air streams into engagement with each other, and with walls of the vessel, and generate frictional heat. Baffle members in an inner chamber of the vessel reduce the size of droplets of gasoline in such chamber. Dry gas is conducted from the treatment vessel to a holding tank, from whence it is supplied to the intake manifold of the engine. Valves of the system are operated in response to actuation of an accelerator associated with the engine. Liquid gasoline from a lower portion of the vessel is supplied to the intake manifold of the engine during initial start-up, and at other times when no dry gasoline vapor is present within the holding tank.

19 Claims, 3 Drawing Sheets

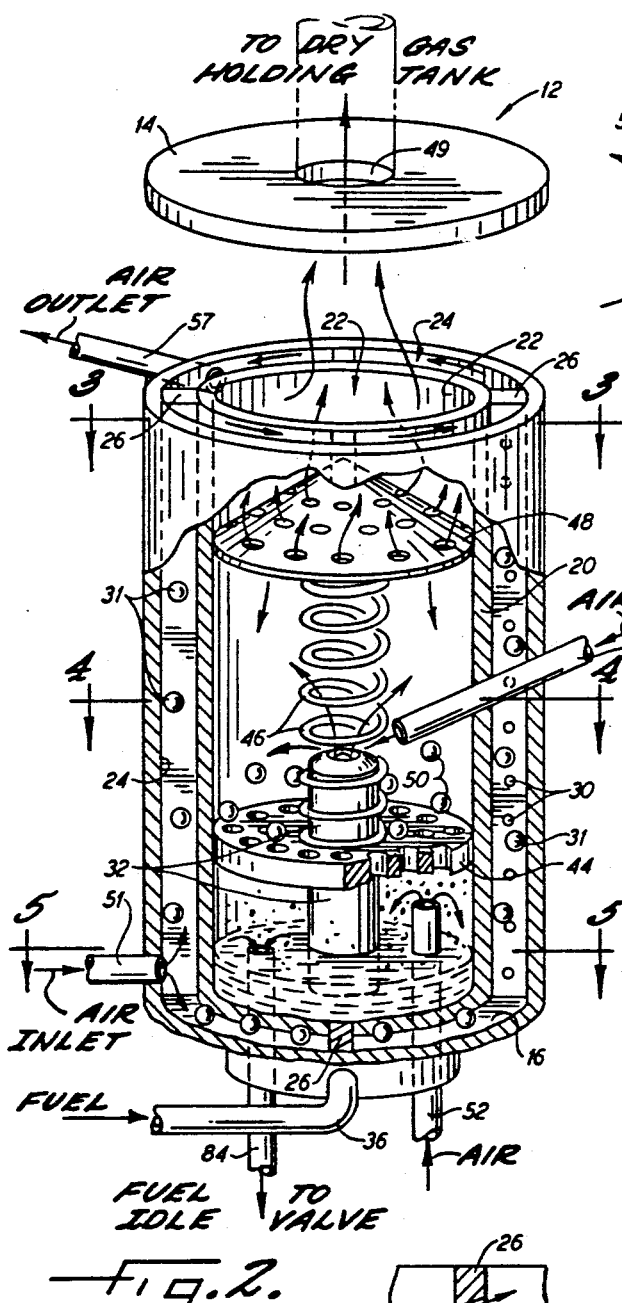
_fig.2._
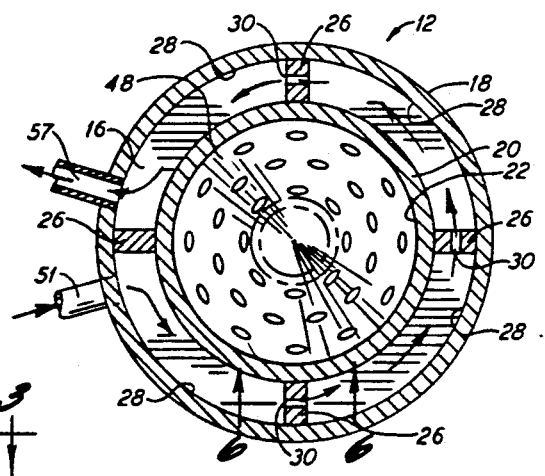
_fig.3._
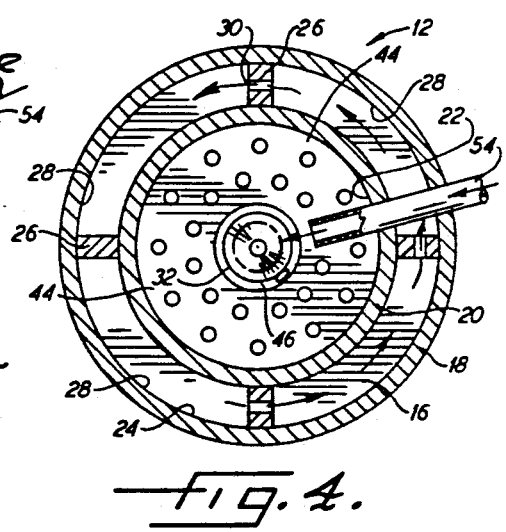
_fig.4._
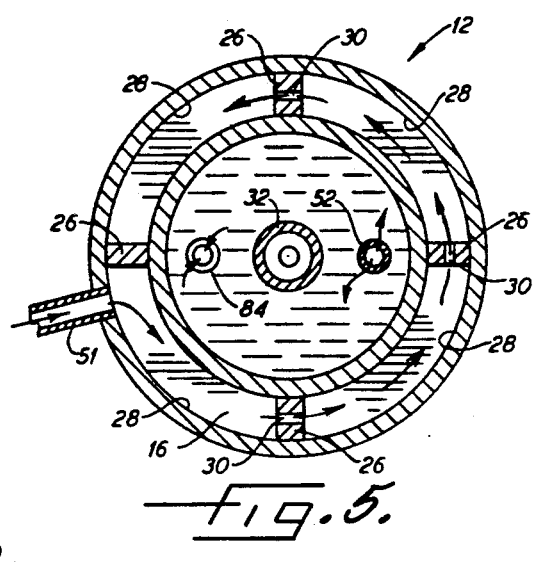
_fig.5._
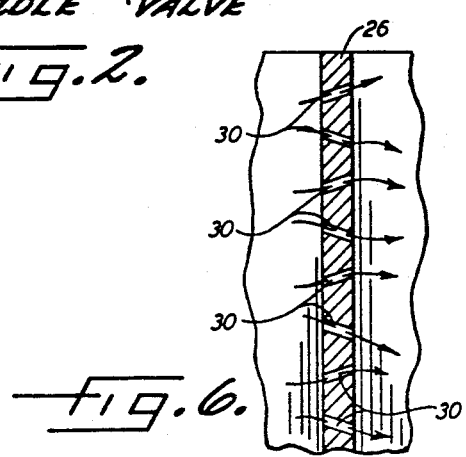
_fig.6._

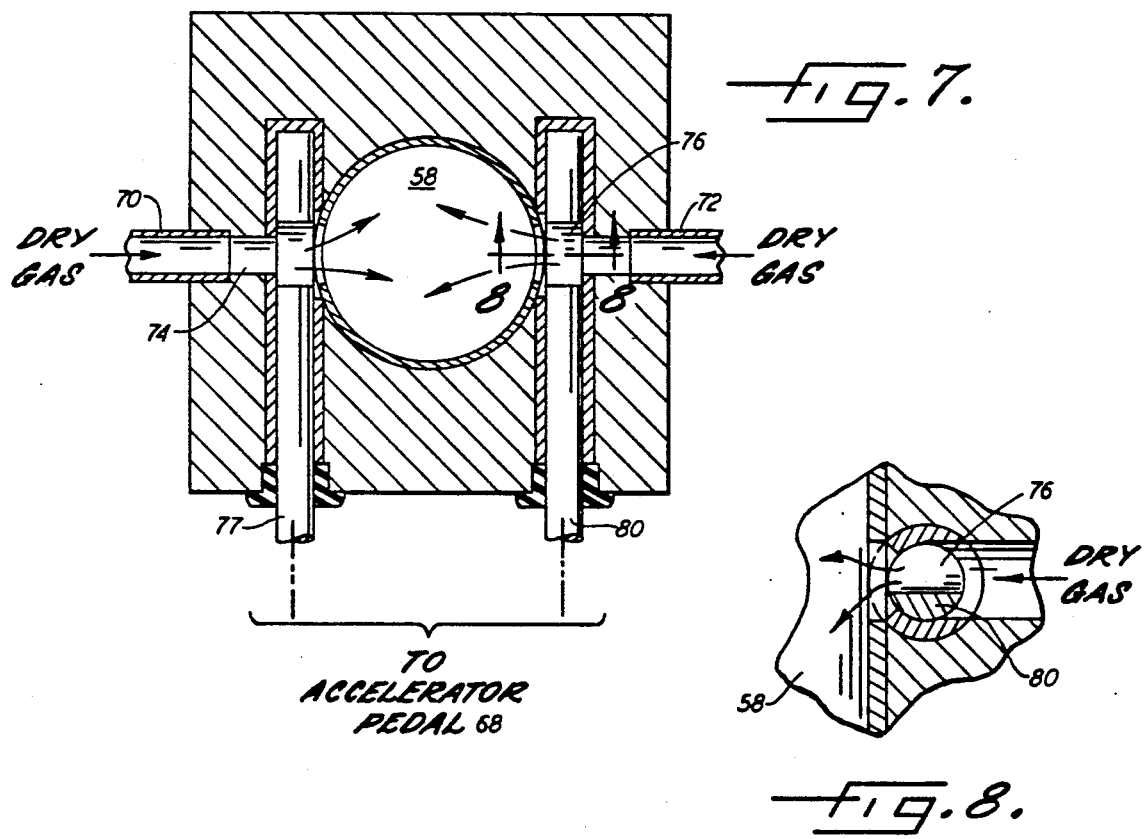

FUEL SUPPLY SYSTEM FOR AN INTERNAL COMBUSTION ENGINE

FIELD OF THE INVENTION

This invention relates to systems for supplying gasoline or similar fuel to an internal combustion engine, such as the engine of an automobile or other vehicle. The invention more specifically relates to a system of the type wherein a substantial part of the liquid gasoline is converted to relatively dry vapor before being introduced into the engine.

BACKGROUND OF THE INVENTION

Gasoline fuel supplied in a conventional manner to an internal combustion engine frequently contains relatively large droplets that undergo incomplete combustion. This reduces the engine's efficiency, and increases the pollutants in its exhaust. In an engine for an automobile or other motor vehicle, the decreased efficiency results in realization of fewer miles per gallon of gasoline.

It has heretofore been recognized that engine efficiency is increased and pollution is decreased when the gasoline is heated and the size of the droplets therein is reduced prior to its introduction into the engine. The present invention provides an improved fuel delivery system for achieving these desired results.

SUMMARY OF THE INVENTION

The fuel supply system of the present invention includes a treatment vessel wherein liquid gasoline is converted to a relatively dry vapor and is mixed with air prior to its introduction into the intake manifold of the engine. The vessel includes a needle valve that sprays liquid gasoline from a suitable source into engagement with a perforate baffle member located within the upper part of an inner chamber of the vessel. Streams of air from a suitable air source are introduced into the vessel at a location adjacent the upper end of the needle valve, and also at a location underlying a second perforate baffle member situated within the lower portion of the inner chamber of the vessel. Air is also introduced into an annular outer chamber of the vessel. The air streams within the outer vessel chamber propel pellet members within the outer chamber into repeated engagement with the chamber walls and each other, and generate frictional heat. The frictional heat generated within the outer chamber heats the walls of, and the pellet and baffle members within, the inner chamber. The heated walls and members dry and vaporize at least a substantial portion of the liquid gasoline introduced into the inner chamber of the vessel. A conduit containing a safety valve conducts the relatively dry gasoline vapor from a vapor outlet in the top wall of the inner chamber of the vessel to a storage tank. The gasoline vapor passes from the storage tank to the intake manifold or similar member of the internal combustion engine upon opening of valve means controlled by the accelerator, or similar speed-regulating member, of the engine. An idle valve upon the intake manifold also receives liquid gasoline conducted thereto from a drain conduit communicating with the lower portion of the inner chamber of the treatment vessel. This permits the engine to operate in a conventional fashion at those times, such as during initial start-up of the engine following a period of nonuse, when there might be insufficient gasoline vapor within the storage tank.

DESCRIPTION OF THE DRAWINGS

Other features of the invention will be apparent from the following description of an illustrative embodiment thereof, which should be read in conjunction with the accompanying drawings, in which:

FIG. 2 is an enlarged partially exploded view of a gasoline treatment vessel shown in FIG. 1, some components of the vessel being broken away so as to better disclose interior details;

FIG. 3 is a sectional view taken substantially along the line and in the direction of the arrows 3—3 through the vessel of FIG. 2;

FIG. 4 is a sectional view taken substantially along the lines and in the direction of the arrows 4—4 through the vessel of FIG. 2;

FIG. 5 is a sectional view taken substantially along the line and in the direction of the arrows 5—5 through the vessel of FIG. 2;

FIG. 6 is a fragmentary sectional view taken substantially along the line and in the direction of the arrows 6—6 of FIG. 3 through a partition wall of an outer chamber of the vessel;

FIG. 7 is a sectional view, taken substantially along the line and in the direction of the arrows 7—7 of FIG. 1, of valves of the system; and FIG. 8 is a fragmentary view, taken substantially along the line and in the direction of the arrows 8—8 of FIG. 7.

DESCRIPTION OF THE PREFERRED EMBODIMENT

Figure 1:
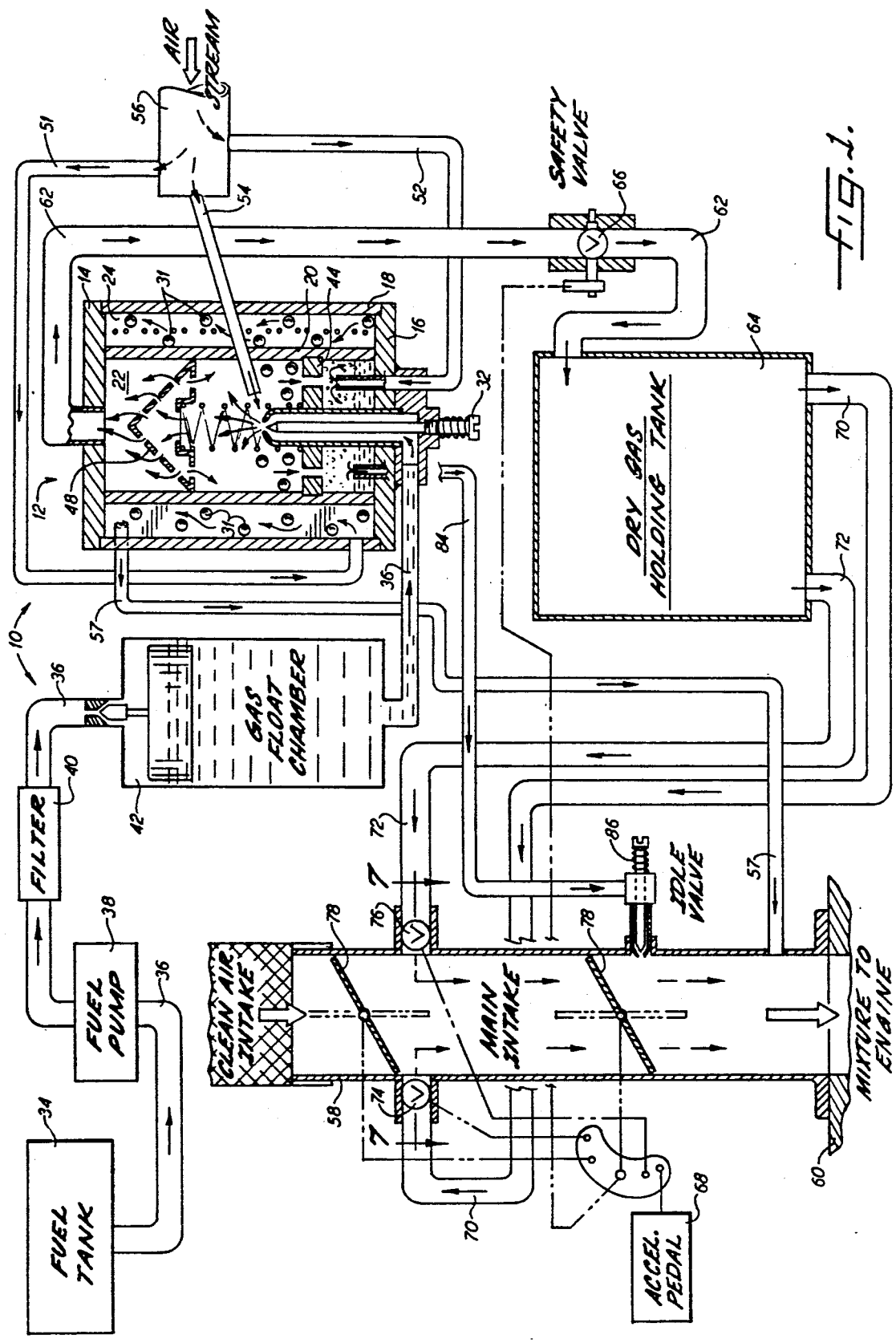
FIG. 1 is a partially diagrammatic and schematic view of a fuel delivery system in accordance with the invention, and of fragmentary components of an internal combustion gasoline-powered engine serviced by the system.

The fuel delivery system identified in its entirety in FIG. 1 by the numeral 10 includes a gasoline treatment vessel 12 formed of aluminum or other metal that is a good conductor of heat. Vessel 12 has top and bottom walls 14, 16, and a cylindrical outer wall 18. Vessel 12 further includes a cylindrical inner wall 20 that is parallel to and spaced radially from outer wall 18. Wall 20 separates a central cylindrical inner chamber 22 of vessel 12 from an annular outer chamber 24 of the vessel. As is best shown in FIGS. 3-6, vessel 12 may and illustratively does further include a plurality of (illustratively four) vertically extending partition walls 26 that are located within outer chamber 24. Walls 26 are preferably and illustratively located at equally spaced intervals (illustratively of approximately 90°) from each other about the circumference of chamber 24, and divide chamber 24 into a plurality (illustratively four) of arcuate compartments 28. As is best shown in FIGS. 3-6, three of the partition walls 26 each have a plurality of vertically spaced air passages 30 extending angularly therethrough. As is best shown in FIG. 6, the angulation of each passage 30 preferably is within the range of approximately 10°-15° and is opposite to that of the passage or passages vertically adjacent to it. While the fourth partition wall 26 (the leftmost one, as viewed in drawing FIGS. 1-5) may also have air passages therethrough, it may be and illustratively is of imperforate construction. Each compartment 28 of outer chamber 24 contains a plurality (illustratively seven) of steel pellets 31. The pellets are illustratively and preferably of spherical shape, and are too large to pass through any of the passages 30 within partition walls 26.

Referring now particularly to FIGS. 1 and 3 of the drawings, a needle valve 32 extends axially through bottom wall 16 of vessel 12 and into inner chamber 22 of the vessel. During operation of system 10, gasoline is delivered to the lower, inlet end of needle valve 32 from a suitable fuel source, such as the fuel tank 34 diagrammatically shown in FIG. 1, via a conduit 36, fuel pump 38, filter 40, and float chamber 42. Needle valve 32 extends through a perforate disc-shaped baffle member 44 located within the lower portion of inner chamber 22 of vessel 12. A coil spring 46 encircles the upper portion of needle valve 32 and extends axially upwardly therefrom. The upper end of spring 46 supports a generally conical baffle member 48 within the upper portion of inner chamber 22. Baffle 48 underlies an outlet opening 49 within top wall 14 of vessel 12, and has a diameter only slightly less than that of inner chamber 22 of the vessel. A plurality (e.g., approximately fourteen or fifteen) of pellet elements 50, which may be and illustratively are of the same size, steel material and shape as the previously described pellets 31, are disposed within that part of inner chamber 22 between baffle members 44, 48.

During operation of system 10, liquid gasoline is sprayed from the upper outlet end of needle valve 32 while streams of air are directed into vessel 12 via a plurality of conduits 51, 52 and 54 from a suitable air source 56 that may include a blower, air pump, vent duct or the like (not shown). Air from conduit 51 passes into the lower part of one of the two compartments 28 separated from each other by the imperforate one of the outer chamber partition walls 26 (FIGS. 3-5). The air passes in counterclockwise direction (as viewed in FIGS. 3-5) through such compartment and then, via the passages 30, sequentially through each of the remaining three compartments 28. The air is discharged from the upper end portion of the final downstream of one of the compartments 28 via an air discharge conduit 57 that may and illustratively does communicate at its outlet end with intake manifold of engine 60. As is indicated in FIGS. 1 and 2 of the drawings, the pellet elements 31 within compartments 28 of annular outer chamber 24 of vessel 12 are repeatedly driven, by the air passing through such compartments, into engagement with the chamber walls and each other. The frictional heat resulting from such engagements increase the temperature of wall 20 of inner chamber 22 of vessel 12, Which, in turn heats the baffles 44, 48, pellets 50 and spring 46 within chamber 22. The conduit 52, that also conducts air from source 56, projects into inner chamber 22 of vessel 12 through bottom wall 16, and directs its air upwardly to and through the lower baffle member 44 within chamber 22. Such air contacts, elevates and is warmed by pellets 50. The third conduit 54 leading from air source 56 has its outlet end adjacent the upper end of needle valve 32, and discharges its air into the gasoline sprayed upwardly from the needle valve. Such air assists the baffle members in reducing the size of the gasoline droplets.

As a result of the increased temperature of vessel 12, and the reduction in size of the droplets of gasoline within inner chamber 22 of vessel 12, a substantial amount of such gasoline is transformed into a relatively dry vaporous state. A conduit 62 extending through top wall 14 of vessel 12 conducts this dry gasoline vapor from inner chamber 22 of vessel 12 into the top portion of a storage or holding tank 64, when a safety valve 66 within such conduit is opened by actuation of the accelerator pedal 68 customarily associated with engine 60. Conduits 70, 72 extending from the bottom of tank 64 conduct dry gasoline vapor from the tank to intake manifold 58 of engine 60 when either of two valves 74, 76 respectively in series with the conduits are opened. Operation of valves 74, 76, in keeping with the operation of safety valve 66, occurs in response to actuation of linkages that are connected to accelerator 68. Additional linkages also connected to accelerator 68 effect operation of butterfly-types valves 78 within intake manifold 58. While the valves 74, 76 that control the passage of dry gasoline vapor from tank 64 to manifold 58 may move between their open and shut positions in unison with each other, preferably the linkages associated therewith are such that one of the valves opens upon initial actuation of the accelerator, and the other of the valves remains closed until the accelerator is actuated to a preselected further extent.

As is indicated in FIGS. 7 and 8 of the drawings, the valves 74, 76 preferably and illustratively include rotatable rods 77, 80 each having a flat section 82 which permits passage of dry gasoline vapor into intake manifold 58 when the rod occupies a first rotative position shown in FIG. 8, and which blocks passage of the dry gasoline vapor when the rod occupies a position displaced 90 from that shown in FIG. 8.

Any unvaporized liquid gasoline within inner chamber 22 of vessel 12 passes downwardly to and is collected within the lower portion of such chamber. Upon reaching a preselected elevation, it is conducted from chamber 22 through a conduit 84 extending to an "idle" needle valve 86 communicating with intake manifold 58 at a location downstream of dry gas control valves, 74, 76 and also downstream of butterfly valves 78.

While the air introduced into vessel 12 may be warm, this is not required since the frictional heat generated by pellet elements 31, 50 is by itself sufficient for operation of the system in the above-described manner.

While a specific embodiment of the invention has been shown and described, this was for purposes of illustration only, and not for purposes of limitation, the scope of the invention being in accordance with the following claims.

I claim:

1. A fuel supply system for a gasoline-powered internal combustion engine having an intake manifold, comprising:
   a source of liquid gasoline;
   a source of air;
   a gasoline treatment vessel having an inner chamber and an outer chamber;
   a lower perforate baffle member mounted within a lower portion of said inner chamber of said vessel;
   an upper perforate baffle member mounted within an upper portion of said inner chamber of said baffle member;
   a needle valve member carried by said vessel, said needle valve member having an inlet communicating with said source of liquid gasoline, and having an outlet disposed within said inner chamber above said upper baffle member, gasoline directed during operation of said system to said needle valve member from said source and being sprayed from said o' i..t of said needle valve member toward said upper baffle member;

means connected to said source of air for introducing streams of air from said source into said inner chamber and into said outer chamber of said vessel during operation of said system;

a plurality of pellets within each of said chambers of said vessel, said pellets within said outer chamber being propelled by said air streams into engagement with walls of said chambers during operation of said system and generating frictional heat, thereby transforming at least part of the liquid gasoline within said inner chamber into relatively dry gasoline vapor;

a holding tank for said gasoline vapor;

means interconnecting said treatment vessel and said holding tank for conducting said gasoline vapor from said inner chamber of said vessel to said holding tank at desired times; and means for conducting said gasoline vapor from said holding tank to said intake manifold of said engine at desired times.

2. A fuel supply system as in claim 1, wherein said source of said liquid gasoline includes a fuel tank, and a fuel pump and a fuel filter and a float chamber located downstream of said fuel tank and upstream of said vessel.

3. A fuel supply system as in claim 2, and further including means within said lower portion of said inner chamber of said vessel for discharging liquid gasoline from said inner chamber when the quantity of said liquid gasoline within said lower portion thereof exceeds a preselected amount.

4. Apparatus as in claim 3, wherein said means for discharging liquid gasoline conducts said liquid gasoline to said intake manifold of said engine.

5. Apparatus as in claim 4, and further including an idle valve upon said intake manifold, and wherein said means for discharging said liquid gasoline conducts said liquid gasoline to said idle valve.

6. A system as in claim 1, and further including generally vertically extending partition walls extending between said inner chamber and said outer chamber of said vessel; said partition walls defining, within said outer chamber, a plurality of discrete laterally-spaced compartments each having a plurality of said pellets therein.

7. A system as in claim 6, wherein laterally adjacent ones of said partition walls are spaced approximately 90° from each other.

8. A system as in claim 7, wherein at least some of said partition walls have passages extending therethrough and permitting communication with an adjacent ones of said compartments; said passages permitting passage of air but preventing passage of said pellets therethrough.

9. A system as in claim 8, wherein said passages within each passage-containing one of said partition walls are spaced from each other along the length of the corresponding one of said partition walls.

10. A system as in claim 9, wherein adjacent ones of said passages of each of said passage-containing partition walls extend in non-parallel relationship to each other.

11. A system as in claim 10, wherein each of said passages of each of said passage-containing partition walls slopes in a direction opposite to the direction of slop of a thereto-adjacent one of said passages within said one of said partition walls.

12. A system as in claim 1, wherein said upper perforate baffle member is of generally conical shape, and further including coil spring means mounting said upper baffle member within said upper portion of said inner chamber of said treatment vessel.

13. A system as in claim 12, wherein said outlet of said needle valve means is located within a lower end portion of said coil spring means.

14. A system as in claim 13, wherein said means for introducing streams of air into said inner chamber of said vessel includes a first member for directing a first stream of air to a location adjacent said outlet of said needle valve means.

15. A system as in claim 14, wherein said means for introducing streams of air into said inner chamber of said vessel includes a second member for directing a second stream of air against and through said lower perforate baffle member from a location below said lower baffle member.

16. A system as in claim 15, wherein said second member has an outlet above the level of any liquid gasoline within said lower portion of said inner chamber of said vessel.

17. A system as in claim 16, and further including safety valve means in series with said conduit interconnecting said inner chamber of said vessel and said holding tank, said vehicle including an accelerator and linkage means interconnecting said accelerator and said safety valve means, said safety valve means being movable from a closed position to an open position in response to actuation of said accelerator.

18. A system as in claim 17, wherein said means for conducting said gasoline vapor from said holding tank to said intake manifold of said engine includes first and second conduits interconnecting said holding tank and said intake manifold, and first and second normally closed valve members in series with respective ones of said first and second conduits, linkage means connecting said accelerator and said first and second valve members for opening one of said valve members in response to initial limited actuation of said accelerator and for opening the other of said valve members in response to greater actuation of said accelerator.

19. Apparatus as in claim 18, wherein said pellets are of spherical shape, and said pellets within said inner chamber of said vessel are too large to pass through said upper and lower baffle members in said inner chamber.

* * * * *